(12) United States Patent
Xiao et al.

(10) Patent No.: US 12,301,041 B2
(45) Date of Patent: May 13, 2025

(54) POWER REPLENISHMENT SYSTEM AND METHOD FOR ENERGY STORAGE DEVICE

(71) Applicant: FranklinWH Technologies Co., Ltd., Guangdong (CN)

(72) Inventors: Gang Xiao, Guangdong (CN); Daqing Wang, Guangdong (CN); Yuezhen Hu, Guangdong (CN)

(73) Assignee: FranklinWH Technologies Co., Ltd., Shenzhen (CN)

( * ) Notice: Subject to any disclaimer, the term of this patent is extended or adjusted under 35 U.S.C. 154(b) by 727 days.

(21) Appl. No.: 17/560,234

(22) Filed: Dec. 22, 2021

(65) Prior Publication Data
US 2022/0115891 A1  Apr. 14, 2022

Related U.S. Application Data

(63) Continuation of application No. PCT/CN2020/136411, filed on Dec. 15, 2020.

(30) Foreign Application Priority Data

Jun. 22, 2020 (CN) .......................... 202010574516.2

(51) Int. Cl.
| | |
|---|---|
| *H02J 7/00* | (2006.01) |
| *H01M 10/44* | (2006.01) |
| *H01M 10/48* | (2006.01) |
| *H02J 3/32* | (2006.01) |
| *H02J 7/04* | (2006.01) |

(52) U.S. Cl.
CPC ....... *H02J 7/00712* (2020.01); *H01M 10/443* (2013.01); *H01M 10/486* (2013.01); *H02J 3/32* (2013.01); *H02J 7/00308* (2020.01); *H02J 7/00309* (2020.01); *H02J 7/0031* (2013.01); *H02J 7/0049* (2020.01); *H02J 7/04* (2013.01)

(58) Field of Classification Search
CPC ............... H02J 7/00712; H02J 7/00308; H02J 7/00309; H01M 10/443; H01M 10/486
USPC ......................................................... 307/46
See application file for complete search history.

(56) References Cited

U.S. PATENT DOCUMENTS

| | | | |
|---|---|---|---|
| 2008/0316774 A1* | 12/2008 | Ito .......................... | B60W 10/26 363/17 |
| 2011/0055037 A1* | 3/2011 | Hayashigawa ......... | B60L 53/16 705/26.1 |

(Continued)

FOREIGN PATENT DOCUMENTS

| | | |
|---|---|---|
| CN | 203504219 U | 3/2014 |
| CN | 206422578 U | 8/2017 |

(Continued)

*Primary Examiner* — Richard V Muralidar

(57) ABSTRACT

The embodiment of the application discloses a power replenishment system and method for energy storage device. The power replenishment system for energy storage device comprises: an energy storage device, and the energy storage device comprises a DC charging interface for power replenishment; a power replenishment device, comprising a DC output interface arranged to be connected with the DC charging interface, the power replenishment device is connected with a power grid end, and the power replenishment device is configured to convert an AC voltage of the power grid end into a DC voltage and transmit the DC voltage to the energy storage device via the DC output interface.

6 Claims, 5 Drawing Sheets

(56) References Cited

U.S. PATENT DOCUMENTS

| | | | | |
|---|---|---|---|---|
| 2011/0140667 A1* | 6/2011 | Moon | ................. | H02J 7/00716 |
| | | | | 320/134 |
| 2011/0298422 A1* | 12/2011 | Failing | ................... | H02J 50/80 |
| | | | | 320/109 |
| 2015/0054466 A1* | 2/2015 | Kinomura | ............... | B60L 53/68 |
| | | | | 320/134 |
| 2019/0176636 A1 | 6/2019 | Wu et al. | | |
| 2019/0252904 A1* | 8/2019 | Tian | ......................... | H02J 7/02 |

FOREIGN PATENT DOCUMENTS

| | | |
|---|---|---|
| CN | 206640323 U | 11/2017 |
| CN | 108039757 A | 5/2018 |

* cited by examiner

POWER REPLENISHMENT SYSTEM AND METHOD FOR ENERGY STORAGE DEVICE

CROSS REFERENCE TO RELATED APPLICATIONS

The present application is a Continuation application of PCT Application No. PCT/CN2020/136411 filed on Dec. 15, 2020, which claims the priority of Chinese patent application No. 202010574516.2, filed with China Patent Office on Jun. 22, 2020, and the contents of which are incorporated herein by reference in their entirety.

TECHNICAL FIELD

The embodiment of the present application relates to energy storage battery technology, for example, a power replenishment system and method for an energy storage device.

BACKGROUND

For household electric energy storage device with AC/DC inverter, energy storage lithium battery pack and management system, the battery may be charged with AC commercial power to store energy, or the battery energy may also be converted into AC commercial power to supply power to power grid or household.

If the lithium battery module in the device is not used after being stored for a long time after leaving the factory, it needs to be recharged regularly, otherwise it will lead to performance loss or damage to the battery pack: (1) which would cause the difference between the voltage and internal resistance of each battery of the battery pack to become larger, resulting the reduction of the charge and discharge capacity of during normal use for users; (2) the monthly self-discharge rate of lithium iron phosphate battery is about 3% when stored at room temperature, and the monthly self-discharge rate can reach more than 5% when stored at 35° C., while the State of Charge (SOC) of the battery is kept at 30%-60% when leaving the factory, if the battery is stored for more than one year, the capacity of the battery pack may be empty, or the battery pack may even be forced to be lower than the failure voltage value, causing irreversible damage to the battery pack.

If the battery pack stored in the warehouse for a long time is to be recharged and maintained, it usually needs the following steps: (1) Unpack the outer package of household energy storage device and expose the whole device; (2) Connect the AC input end of the device and the mains input switch with an AC cable (with wiring tools); (3) Turn on the control switch on the device; (4) Turn on the mains switch (usually Alternating Current (AC) 240 V/60 Hz); (5) After the device is powered on and started, the battery management system detects that the battery needs to be recharged, and would start the charging process, and usually, the charging current is less than or equal to 2I10 (I10 represents the 10-hour rate discharge current, unit: ampere (A), 2I10 is twice that of I10, where I10=C10/10, C10 represents the capacity of the battery discharged for 10 hours, unit: (Ah); (6) There is a charging status indicator on the device. If the charging status is no longer shown, the power replenishment process is completed; (7) Turn off the mains switch, turn off the device control switch and remove the AC cable; (8) Repackaging the device; the energy storage device is equipped with a lithium battery module, with a large capacity of more than 10 KWH, high voltage, and a large size and weight (usually more than 100 KG and more than 1 m in height). It can be seen that there are many operation steps in the whole power replenishment process. It requires handling the device and removing the whole package, which is labor intensive and time-consuming. In addition, it needs to be connected with AC high voltage, and operators need to operate carefully to ensure personal safety.

SUMMARY

The application provides a power replenishment system for energy storage device, aiming to realize the effect of online charging for energy storage battery without removing the packaging of energy storage device.

In a first aspect, an embodiment of the present application provides a power replenishment system for energy storage device, including:
 an energy storage device, including a DC charging interface for power replenishment;
 a power replenishment device, including a DC output interface arranged to be connected with the DC charging interface, the power replenishment device is connected with a power grid end, and the power replenishment device is configured to convert an AC voltage of the power grid end into a DC voltage and transmit the DC voltage to the energy storage device via the DC output interface.

In a second aspect, the embodiment of the present application further provides a power replenishment method for energy storage device, applying to transmit a voltage of a power grid end to an energy storage device, including:
 establishing connection with a DC charging interface of the energy storage device;
 converting a first AC voltage of the power grid end into a first DC voltage according to a charging start instruction;
 converting the first DC voltage into a second DC voltage and transmitting the second DC voltage to the energy storage device.

DETAILED DESCRIPTION OF DISCLOSED EMBODIMENTS

Figure 1:
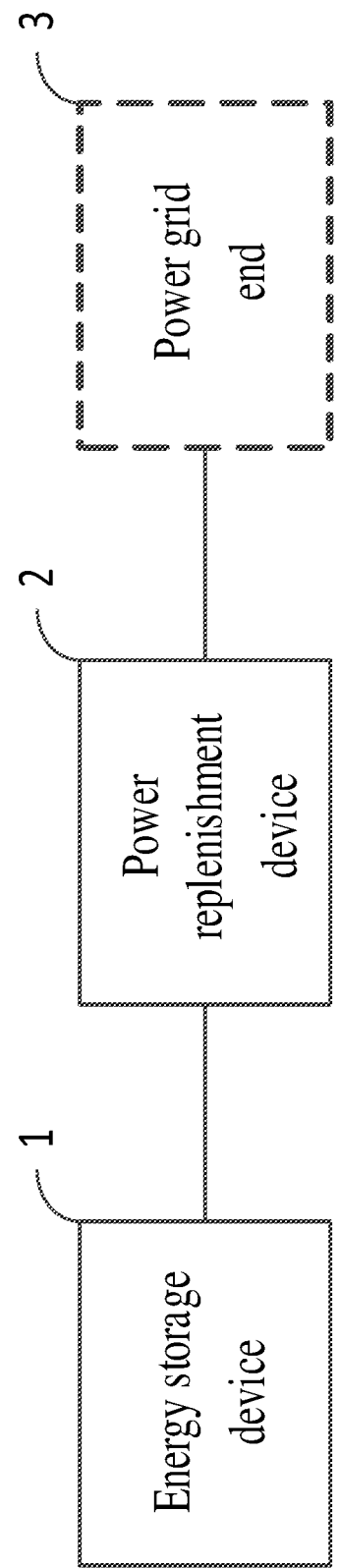
FIG. 1 is a module connection diagram of a power replenishment system for energy storage device provided in Embodiment 1 of the present application.

Before discussing the exemplary embodiments in more detail, it should be note that some exemplary embodiments are described as processes or methods depicted as flowcharts. Although the flowchart describes the steps as sequential processing, many of them may be implemented in parallel, concurrently or simultaneously. In addition, the order of steps may be rearranged. The processing may be terminated when the operation is completed, but there may be additional steps not included in the drawings. The processing may correspond to methods, functions, procedures, subroutines, etc.

Further, that term "first," "second," and the like may be used herein to describe various direction, actions, steps, or elements, etc., but those direction, actions, steps, or elements are not limited by these terms. These terms are only used to distinguish the first direction, action, step or element from another direction, action, step or element. For example, without departing from the scope of this application, the first voltage may be referred to as the second voltage, and similarly, the second voltage may be referred to as the first voltage. The first voltage and the second voltage are both voltage, but they are not the same voltage. The terms "first", "second" and so on cannot be understood as indicating or implying relative importance or implicitly indicating the number of the technical features. Thus, the features defined by "first" and "second" may explicitly or implicitly include one or more of the features. In the description of the embodiments of the present application, "a plurality of" means at least two, such as two, three, etc., unless otherwise explicitly defined. And the singular terms "a", "an" and "the" include plural reference and vice versa unless the context clearly indicates otherwise.

Embodiment 1

FIG. 1 is a module connection diagram of a power replenishment system for energy storage device provided in the Embodiment 1 of this application. This embodiment may be applied for power replenishment of energy storage device 1, including an energy storage device 1 and a power replenishment device 2.

Figure 2:
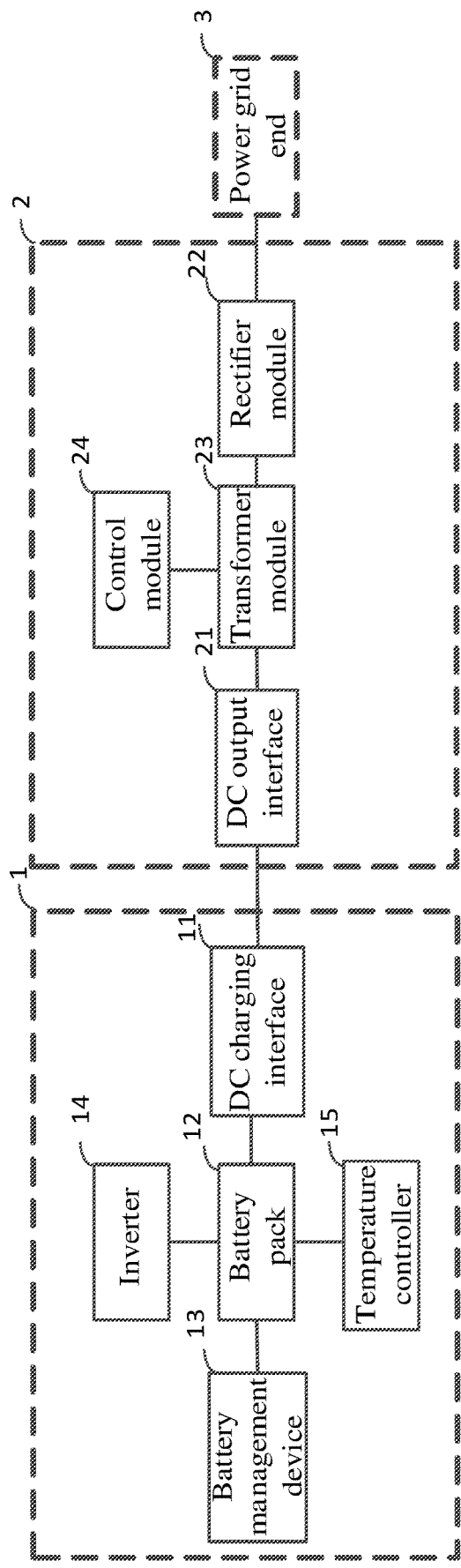
FIG. 2 is a circuit connection diagram of a power replenishment system for energy storage device provided in Embodiment 1 of the present application.

Referring to FIG. 2, which is a circuit connection diagram of a power replenishment system for energy storage device provided in this embodiment. In this embodiment, the energy storage device 1 includes a DC charging interface 11, a battery pack 12, a battery management device 13, an inverter 14 and a temperature controller 15.

In this embodiment, the DC charging interface 11 may be a power replenishment socket, which can receive externally transmitted direct current and be directly connected to the battery pack 12 in the energy storage device 1 through wires. In this embodiment, the power replenishment socket is exemplarily arranged on the surface of the energy storage device or exposed on the transport packaging housing of the energy storage device, which is convenient for direct charging without removing the packaging of the energy storage device 1. A dust-proof box may be arranged to protect the power replenishment socket. When the power replenishment socket is not used, the dust-proof box is closed to protect the power replenishment socket from dust. In the case of power replenishment for the energy storage device 1, power replenishment can be performed after removing the dust-proof box.

In this embodiment, the battery pack 12 is connected with the DC charging interface 11, and the battery pack 12 is configured to receive DC voltage to store electric energy. Battery pack 12 is a lithium battery module. Lithium batteries generally use manganese dioxide as the positive electrode material, lithium metal or its alloy metal as the negative electrode material and non-aqueous electrolyte solution, which can be repeatedly charged and discharged. In the battery pack 12 of this embodiment, the electric energy capacity is larger than 10 KWH, the voltage is high, the size and weight of the device are larger, usually more than 100 KG, the height is more than 1 m, and the packaging size is large. In this embodiment, the DC charging interface 11 is directly connected to the battery pack 12 through a wire, and directly supplies electricity to the battery pack 12.

Battery management device 13 is connected to the battery pack 12, and the battery management device 13 is arranged to detect and control the charging process of the battery pack 12.

In this embodiment, the battery management device 13 is a BMS (BATTERY MANAGEMENT SYSTEM), which is commonly known as battery nanny or battery housekeeper. Its main purpose is to intelligently manage and maintain each battery unit, prevent overcharge or overdischarge of the battery, prolong the service life of the battery and monitor the state of the battery. Generally, BMS would monitor the charge and discharge usage and real-time voltage of battery pack 12 in real time and control the charge and discharge power of battery pack 12.

Inverter 14 is connected with the battery pack 12. The inverter 14 is configured to convert the alternating current of the power grid end 3 into direct current to charge the battery pack 12, or convert the direct current of the battery pack 12 into alternating current to supply power to the power grid end 3.

In this embodiment, the inverter 14 is a converter that converts direct current energy (batteries, storage batteries) into constant frequency, constant voltage or frequency modulation and voltage regulation alternating current (generally 220V, 50 Hz sine wave). It consists of inverter bridge, control logic and filter circuit. In this embodiment, the inverter 14 can perform bidirectional conversion, converting alternating current of the power grid end 3 into direct current to be transmitted to the battery pack 12 when the battery pack 12 needs to be charged, and converting direct current of the battery pack 12 into alternating current to be transmitted to the power grid end 3 when the battery pack 12 needs to be discharged.

A temperature controller 15 is connected with the battery pack 12, and the temperature controller 15 is configured to monitor the working temperature of the battery pack 12.

In this embodiment, the temperature controller 15 is composed of a plurality of thermometers, each of which is arranged at different positions inside the energy storage device 1 to detect the temperature of the energy storage device 1 at different positions. When the battery pack 12 is abnormal in operation, the thermometer will detect the abnormal temperature and give an alarm to prompt the user to cut off the operation of the battery pack 12.

In this embodiment, the power replenishment device 2 includes a DC output interface 21, a rectifier module 22, a transformer module 23 and a control module 24.

the DC output interface 21 is connected to the DC charging interface 11, the power replenishment device 2 is connected with a power grid end 3, and the power replenishment device 2 is configured to convert an AC voltage of the power grid end 3 into a DC voltage and transmit the DC voltage to the energy storage device 1 via the DC output interface 21.

the DC output interface 21 is paired with the DC charging interface 11 in the energy storage device 1, and the DC output interface 21 may be a power replenishment plug, which is physically connected with a power replenishment socket, and then electric energy can be transferred after connection. In order to avoid connecting or removing dangerous mains electricity, the relatively safe low-voltage DC is used for charging, which is generally 48V DC.

the rectifier module 22 is configured to convert a first AC voltage of the power grid end into a first DC voltage.

In this embodiment, the first AC voltage is the output voltage of the power grid end 3, which is generally 220V AC. The first DC voltage is a DC voltage rectified by the rectifier module 22, which is generally 220V DC. The rectifier module 22 has the same function as the inverter 14. The rectifier module 22 includes an electromagnetic rectifier circuit, through which the alternating current of the power grid end 3 is changed to direct current.

The transformer module 23 is connected with the rectifier module 22, and the transformer module 23 is configured to convert the first DC voltage into a second DC voltage and transmit the second DC voltage to the energy storage device 1.

In this embodiment, the second DC voltage is a low-voltage DC voltage converted by the transformer module 23, which is generally the battery charging voltage of 48V, and is directly transmitted to the battery pack 12 via the DC charging interface 11. It may also be adjusted adaptively according to different battery models, which is not limited in this embodiment. The transformer module 23 may be composed of transformer coils, and the voltage value of the second DC voltage may be adjusted by adjusting the ratio of the transformer coils.

The control module 24 is configured to a generate control signal to control the rectifier module 22 and the transformer module 23 to work.

In this embodiment, the control module 24 includes an MCU (Microcontroller Unit). MCU is also known as single-chip microcomputer, which reduces the frequency and specification of the central processing unit appropriately. Memory, counter, Universal Serial Bus (USB), Analog/Digital (A/D) convertor, Universal Asynchronous Receiver/Transmitter (UART), Programmable Logic Controller (PLC), Direct Memory Access (DMA) and other peripheral interfaces, even Liquid Crystal Display (LCD) driver circuits are integrated on a single chip, forming a chip-level computer, and realizing different combination control for different applications. The MCU controls the working conditions of the rectifier module 22 and the transformer module 23 by generating control signals.

The embodiment of the application provides a power replenishment system for energy storage device, including: an energy storage device, wherein the energy storage device includes a DC charging interface for power replenishment; a power replenishment device, including a DC output interface arranged to be connected with the DC charging interface, the power replenishment device is connected with a power grid end, and the power replenishment device is configured to convert an AC voltage of the power grid end into a DC voltage and transmit the DC voltage to the energy storage device via the DC output interface. By arranging a power replenishment interface on the surface of the energy storage device, the voltage of the power grid end can be transmitted to the energy storage device simply by connecting the power replenishment device with the power replenishment interface arranged on the surface of the energy storage device during power replenishment process. In this way, the situation that the packaging needs to be removed and the wiring needs to be redone when the energy storage device is recharged in the related technology is avoided, the workload and labor intensity of recharging the device are reduced, and the safety of recharging the device is improved.

Embodiment 2

Figure 3:
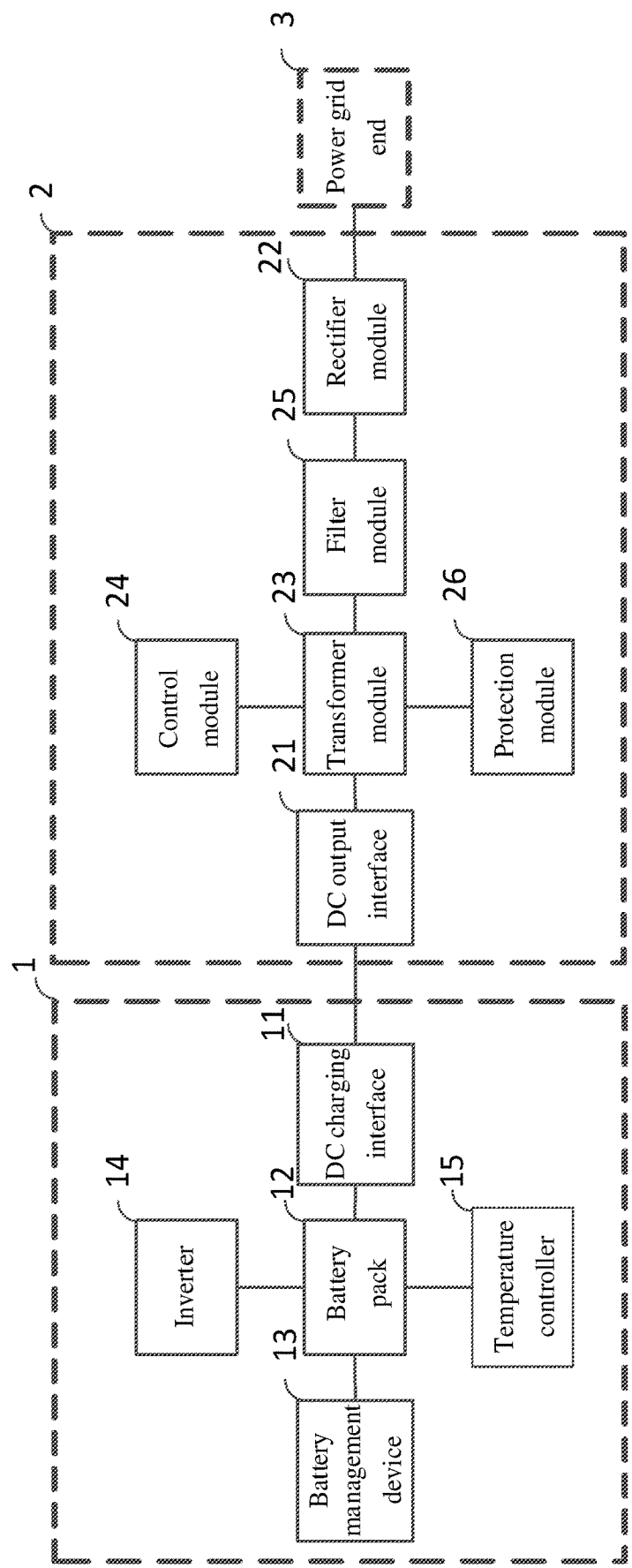
FIG. 3 is a circuit connection diagram of a power replenishment system for energy storage device provided in Embodiment 2 of the present application.

FIG. 3 is a circuit connection diagram of a power replenishment system for energy storage device provided by the Embodiment two of the present application. This embodiment adds other functions on the basis of Embodiment one. This embodiment may be applied to the case of power replenishment for the energy storage device 1, including energy storage device 1 and power replenishment device 2.

In this embodiment, the energy storage device 1 includes a DC charging interface 11 for power replenishment, a battery pack 12, a battery management device 13, an inverter 14 and a temperature controller 15.

The battery pack 12 is connected to the DC charging interface 11, and the battery pack 12 is configured to store electric energy.

The battery management device 13 is connected to the battery pack 12, and the battery management device 13 is configured to detect and control the charging process of the battery pack 12.

The inverter 14 is connected with the battery pack 12. The inverter 14 is configured to convert the alternating current of the power grid end 3 into direct current to charge the battery pack 12, or convert the direct current of the battery pack 12 into alternating current to supply power to the power grid end 3.

Temperature controller 15 is connected with the battery pack 12, and the temperature controller 15 is configured to monitor the working temperature of the battery pack 12.

In this embodiment, the power replenishment device 2 includes a DC output interface 21, a rectifier module 22, a transformer module 23, a control module 24, a filter module 25 and a protection module 26.

the DC output interface 21 is connected to the DC charging interface 11, the power replenishment device 2 is connected with a power grid end 3, and the power replenishment device 2 is configured to convert an AC voltage of the power grid end 3 into a DC voltage and transmit the DC voltage to the energy storage device 1 via the DC output interface 21.

the rectifier module 22 is configured to convert a first AC voltage of the power grid end into a first DC voltage.

The transformer module 23 is connected with the rectifier module 22, and the transformer module 23 is configured to convert the first DC voltage into a second DC voltage and transmit the second DC voltage to the energy storage device 1.

The control module 24 is configured to a generate control signal to control the rectifier module 22 and the transformer module 23 to work.

The filter module 25 is arranged between the rectifier module 22 and the transformer module 23, and is connected with the rectifier module 22 and the transformer module 23 respectively. The filter module 25 is configured to filter out the input noise in the first DC voltage.

In this embodiment, the filter module 25 may be composed of a filter circuit, which is usually used to filter out the ripple in the rectified output voltage, and is generally composed of reactive elements, such as Capacitance (C) connected in parallel across the load resistor, or Inductors (L) connected in series with the load, and various complex filter circuits composed of capacitors and inductors. The filter module 25 is mainly configured to remove the circuit noise in the first DC voltage and improve the stability of the first DC voltage.

The protection module 26 is connected with the transformer module 23. The protection module 26 is configured to cut off the connection between the energy storage device 1 and the power replenishment device 2 when an abnormal situation occurs during the power replenishment of the energy storage device 1.

In this embodiment, the protection module 26 may include at least one of output overvoltage protection, output overcurrent protection, output short circuit protection and charging timeout protection, etc. The output overvoltage protection and output overcurrent protection can forcibly cut off the charging process of the battery pack 12 when the circuit voltage and current exceed the preset value, thus protecting the safety of the battery pack 12. The output short circuit protection would also immediately cut off the internal circuit of the power replenishment device 2 when there is a short circuit in the power replenishment device 2, so as to prevent the battery pack 12 from being damaged by the large voltage during the short circuit. The charging timeout protection can limit the charging time, which is generally 1.5 hours. When the charging time is exceeded, the charging socket would be disconnected immediately, so as to avoid the influence of excessive charging amount on the battery operation.

The embodiment of the application provides a power replenishment system for energy storage device, including: an energy storage device, wherein the energy storage device includes a DC charging interface for power replenishment; a power replenishment device, including a DC output interface arranged to be connected with the DC charging interface, the power replenishment device is connected with a power grid end, and the power replenishment device is configured to convert an AC voltage of the power grid end into a DC voltage and transmit the DC voltage to the energy storage device via the DC output interface. By arranging a power replenishment interface on the surface of the energy storage device, the voltage of the power grid end can be transmitted to the energy storage device simply by connecting the power replenishment device with the power replenishment interface arranged on the surface of the energy storage device during power replenishment process. In this way, the situation that the packaging needs to be removed and the wiring needs to be redone when the energy storage device is recharged in the related technology is avoided, the workload and labor intensity of recharging the device are reduced, and the safety of recharging the device is improved.

Embodiment 3

Figure 4:
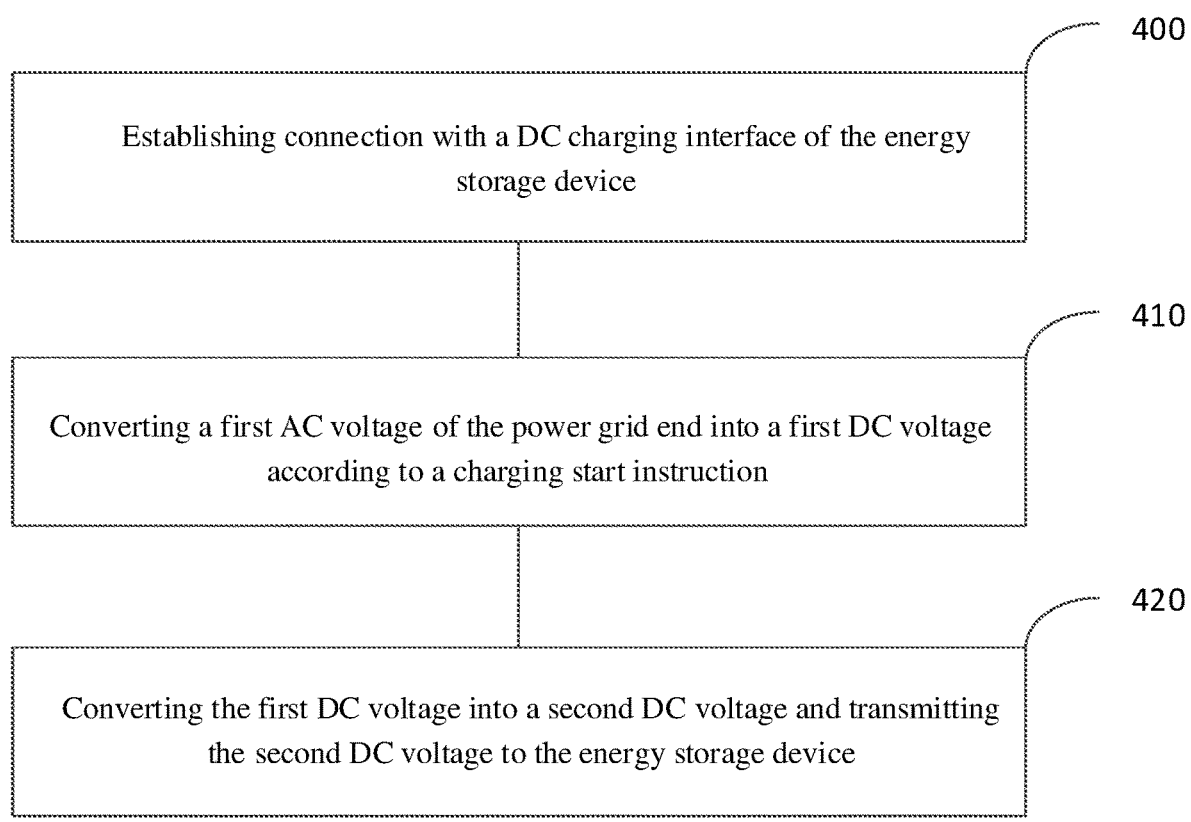
FIG. 4 is a flow chart of a power replenishment method for energy storage device provided in the Embodiment 3 of the present application.

FIG. 4 is a flow chart of a power replenishment method for energy storage device provided by Embodiment 3 of the present application. This embodiment may be applied to the situation that the energy storage device is recharged by power replenishment device, including steps 400 to 420.

Step 400, establishing connection with a DC charging interface of the energy storage device.

In this embodiment, the DC charging interface may be a power replenishment socket, which can receive externally transmitted direct current and be directly connected to the battery pack in the energy storage device through wires. In this embodiment, the power replenishment socket is exemplarily arranged on the surface of the energy storage device, which is convenient for direct charging without removing the package of the energy storage device. A dust-proof box may be arranged to protect the power replenishment socket, when the power replenishment socket is not used, the dust-proof box is closed to protect the power replenishment socket from dust. In the case of power replenishment for the energy storage device, power replenishment can be performed after opening the dust-proof box. In this embodiment, the power replenishment device first establishes a circuit connection with the energy storage device to provide a transmission path of electric energy.

Step 410, converting a first AC voltage of the power grid end into a first DC voltage according to a charging start instruction;

In this embodiment, the charging start instruction is generated by the power replenishment device when the user chooses to charge the energy storage device, and the first AC voltage is the output voltage of the power grid end, which is generally 220V AC. The first DC voltage is a DC voltage rectified by the rectifier module of power replenishment device, which is generally 220V DC. The charging start instruction controls the voltage of the power grid end to be transmitted to the power replenishment device, and the power replenishment device then converts the first AC voltage of the power grid end into the first DC voltage.

Step 420, converting the first DC voltage into a second DC voltage and transmitting the second DC voltage to the energy storage device.

In this embodiment, the second DC voltage is the low-voltage DC voltage converted by the power replenishment device, which is generally the battery charging voltage of 48V. The second DC voltage may be adjusted according to different models of battery packs. The second DC voltage may be directly transmitted to the energy storage device via the DC charging interface.

In an alternative embodiment, step 420 further includes steps 421 to 422.

Step 421, converting the first DC voltage into a second DC voltage.

Step 422, determining whether the second DC voltage meets a preset charging voltage, if yes, transmitting the second DC voltage to the energy storage device; if no, disconnecting the connection with the energy storage device.

In an alternative embodiment, the preset charging voltage is the charging voltage of the battery pack in the energy storage device. When the second DC voltage is used to charge the energy storage device, it will first be determined whether the second DC voltage is the same as the preset charging voltage. If the second DC voltage is the same as the preset charging voltage, it indicates that the power replenishment device is working normally at this time, and the energy storage device can be normally charged. If the second DC voltage is different from the preset charging voltage, it indicates that there is a fault inside the power replenishment device, and it is necessary to disconnect the energy storage device and the power replenishment device immediately at this time to avoid damage to the battery pack of the energy storage device.

The power replenishment method for energy storage device provided by the embodiment of the application includes the following steps: establishing connection with a DC charging interface of the energy storage device; converting a first AC voltage of the power grid end into a first DC voltage according to a charging start instruction; converting the first DC voltage into a second DC voltage and transmitting the second DC voltage to the energy storage device. By arranging a power replenishment interface on the surface of the energy storage device, the voltage of the power grid end can be transmitted to the energy storage device simply by connecting the power replenishment device with the power replenishment interface arranged on the surface of the energy storage device during power replenishment process. In this way, the situation that the packaging needs to be removed and the wiring needs to be redone when the energy storage device is recharged in the related technology is avoided, the workload and labor intensity of recharging the device are reduced, and the safety of recharging the device is improved.

Embodiment 4

Figure 5:
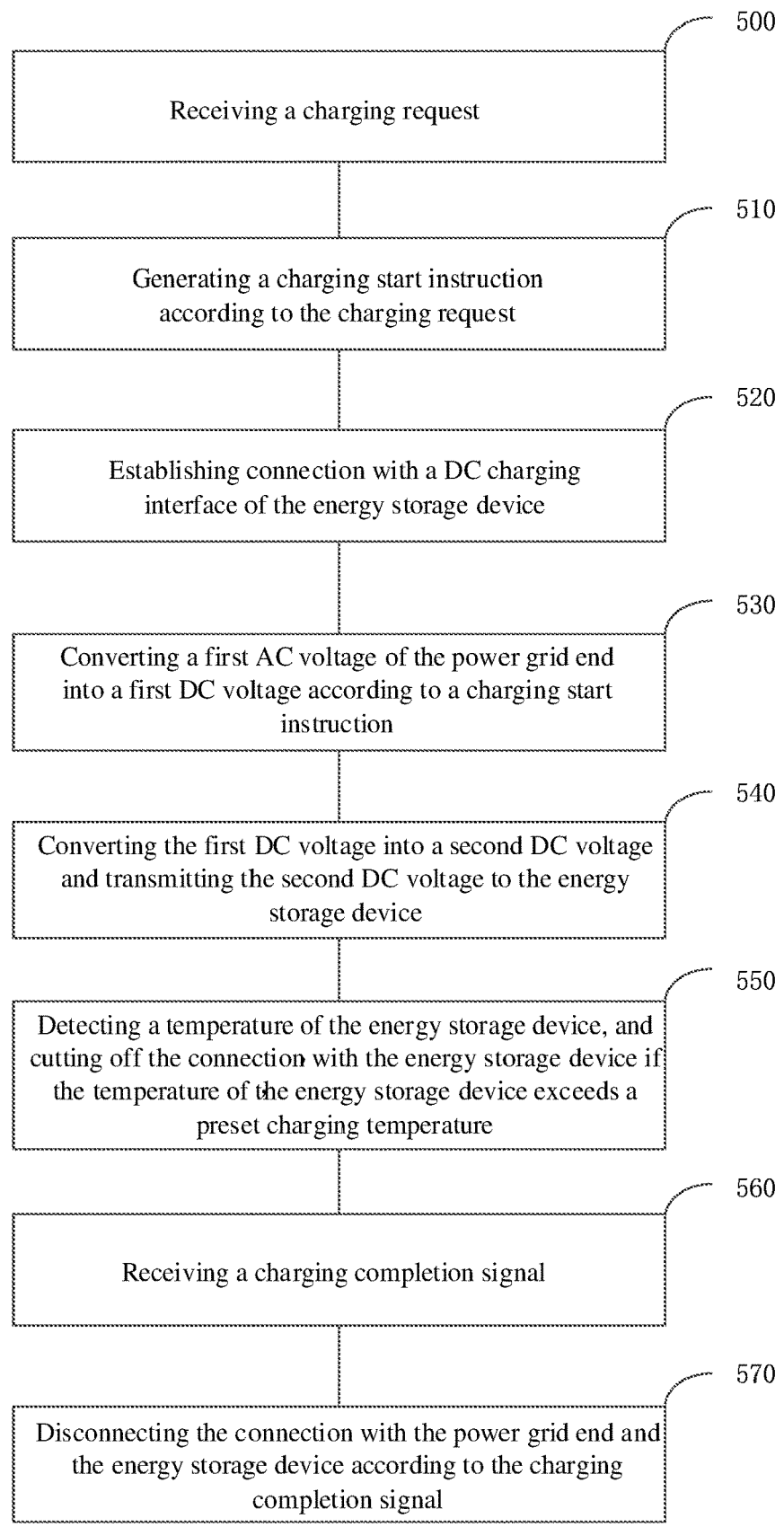
FIG. 5 is a flow chart of a power replenishment method for energy storage device provided in the Embodiment 4 of the present application.

FIG. 5 is a flow chart of a power replenishment method for energy storage device provided by Embodiment 3 of the present application. This embodiment may be applied to the situation that the energy storage device is recharged by power replenishment device, including steps 500 to 570.

Step 500, receiving a charging request.

In this embodiment, the charging request is generated by the user. After receiving the charging request from the user, the charging device checks other parameters such as the model of the energy storage device to be charged, debugs various internal parameters, and enters charging preparation stage.

Step 510, generating a charging start instruction according to the charging request.

In this embodiment, the charging start command is generated by the power replenishment device when the user chooses to charge the energy storage device. The charging start instruction controls the voltage of the power grid end to be transmitted to the power replenishment device, and the power replenishment device then converts the first AC voltage of the power grid end into the first DC voltage.

Step 520, establishing connection with a DC charging interface of the energy storage device.

Step 530, converting a first AC voltage of the power grid end into a first DC voltage according to a charging start instruction;

Step 540, converting the first DC voltage into a second DC voltage and transmitting the second DC voltage to the energy storage device.

Step 550, detecting a temperature of the energy storage device, and cutting off the connection with the energy storage device if the temperature of the energy storage device exceeds a preset charging temperature.

In this embodiment, the preset charging temperature is the temperature of the energy storage device during the normal charging process. In the process of recharging the energy storage device, if it is detected that the temperature of the energy storage device exceeds the preset charging temperature, it indicates that the load power of the energy storage device may be too high at this time, which is likely to cause damage, and the power replenishment device would immediately cut off the connection with the energy storage device for safety.

Step 560, receiving a charging completion signal.

In this embodiment, the charging completion signal is generated by the energy storage device. When the battery pack in the energy storage device is replenished to 100%, the energy storage device would immediately send the charging completion signal to the power replenishment device, prompting that "the power replenishment device has completed the power replenishment".

In step 570, disconnecting the connection with the power grid end and the energy storage device according to the charging completion signal.

In this embodiment, after receiving the charging completion signal, the charging device would immediately disconnect the connection with the energy storage device, so as to avoid shortening the service life of the battery pack caused by overcharging the energy storage device.

The power replenishment method for energy storage device provided by the embodiment of the application includes the following steps: receiving a charging request; generating a charging start instruction according to the charging request; establishing connection with a DC charging interface of the energy storage device; converting a first AC voltage of the power grid end into a first DC voltage according to a charging start instruction; converting the first DC voltage into a second DC voltage and transmitting the second DC voltage to the energy storage device; detecting a temperature of the energy storage device, and cutting off the connection with the energy storage device if the temperature of the energy storage device exceeds a preset charging temperature; receiving a charging completion signal; disconnecting the connection with the power grid end and the energy storage device according to the charging completion signal. By arranging a power replenishment interface on the surface of the energy storage device, the voltage of the power grid end can be transmitted to the energy storage device simply by connecting the power replenishment device with the power replenishment interface arranged on the surface of the energy storage device during power replenishment process. In this way, the situation that the packaging needs to be removed and the wiring needs to be redone when the energy storage device is recharged in the related technology is avoided, the workload and labor intensity of recharging the device are reduced, and the safety of recharging the device is improved.

What is claimed is:

1. A power replenishment system for energy storage device, comprising:
   an energy storage device, comprising a DC charging interface for power replenishment;
   a power replenishment device, comprising a DC output interface arranged to be connected with the DC charging interface, the power replenishment device is connected with a power grid end, and the power replenishment device is configured to convert an AC voltage of the power grid end into a DC voltage and transmit the DC voltage to the energy storage device via the DC output interface;
   wherein the power replenishment device further comprises:
   a rectifier module, configured to convert a first AC voltage of the power grid end into a first DC voltage;
   a transformer module, connected with the rectifier module, and the transformer module is configured to convert the first DC voltage into a second DC voltage and transmit the second DC voltage to the energy storage device;
   a control module, configured to generate a control signal to control the rectifier module and the transformer module to work; and
   the system further comprises a protection module, wherein the protection module is connected with the transformer module, and the protection module is configured to cut off the connection between the energy storage device and the power replenishment device when an abnormal situation occurs during power replenishment process of the energy storage device.

2. The system of claim 1, wherein the energy storage device further comprises:
   a battery pack, connected with the DC charging interface, and the battery pack is configured to store electric energy;

a battery management device, connected with the battery pack, and the battery management device is configured to detect and control charging process of the battery pack;

an inverter, connected with the battery pack, and the inverter is configured to convert an alternating current of the power grid end into a direct current to charge the battery pack, or to convert a direct current of the battery pack into alternating current to supply power to the power grid end;

a temperature controller, connected with the battery pack, and the temperature controller is configured to monitor working temperature of the battery pack.

3. The system of claim 1, wherein the power replenishment device further comprises a filter module, the filter module is arranged between the rectifier module and the transformer module, and connected with the rectifier module and the transformer module respectively, and the filter module is configured to filter out input noise in the first DC voltage.

4. A power replenishment method for energy storage device, applying to transmit a voltage of a power grid end to an energy storage device, comprising:

establishing connection with a DC charging interface of the energy storage device;

converting a first AC voltage of the power grid end into a first DC voltage according to a charging start instruction;

converting the first DC voltage into a second DC voltage and transmitting the second DC voltage to the energy storage device;

the step of converting the first DC voltage into a second DC voltage and transmitting the second DC voltage to the energy storage device, comprises:

converting the first DC voltage into a second DC voltage;

determining whether the second DC voltage meets a preset charging voltage, if yes, transmitting the second DC voltage to the energy storage device; if no, disconnecting the connection with the energy storage device;

after the step of converting the first DC voltage into a second DC voltage and transmitting the second DC voltage to the energy storage device, further comprising:

receiving a charging completion signal;

disconnecting the connection with the power grid end and the energy storage device according to the charging completion signal.

5. The method of claim 4, prior to the step of converting a first AC voltage of the power grid end into a first DC voltage according to a charging start instruction, further comprising:

receiving a charging request;

generating a charging start instruction according to the charging request.

6. The method of claim 4, further comprising: detecting a temperature of the energy storage device, and cutting off the connection with the energy storage device if the temperature of the energy storage device exceeds a preset charging temperature.

* * * * *